(12) United States Patent
Vittrup

(10) Patent No.: US 8,777,701 B2
(45) Date of Patent: Jul. 15, 2014

(54) SHRIMP PEELING MACHINE AND METHOD AND APPLICATION

(76) Inventor: Thomas Vittrup, Saeby (DK)

( * ) Notice: Subject to any disclaimer, the term of this patent is extended or adjusted under 35 U.S.C. 154(b) by 0 days.

(21) Appl. No.: 14/114,119

(22) PCT Filed: Apr. 11, 2012

(86) PCT No.: PCT/DK2012/000037
§ 371 (c)(1),
(2), (4) Date: Nov. 21, 2013

(87) PCT Pub. No.: WO2012/146246
PCT Pub. Date: Nov. 1, 2012

(65) Prior Publication Data
US 2014/0087642 A1    Mar. 27, 2014

(30) Foreign Application Priority Data
Apr. 27, 2011 (DK) ................................. 2011 00324

(51) Int. Cl.
*A22C 29/02* (2006.01)
(52) U.S. Cl.
USPC .............................................................. 452/5
(58) Field of Classification Search
USPC ....................................................... 452/1–6
See application file for complete search history.

(56) References Cited

U.S. PATENT DOCUMENTS

| | | | |
|---|---|---|---|
| 2,832,092 A | | 4/1958 | Lapeyre et al. |
| 3,629,904 A | * | 12/1971 | Zober et al. ........................ 452/4 |
| 3,740,795 A | * | 6/1973 | Cox ................................. 452/5 |
| 3,975,797 A | * | 8/1976 | Grimes et al. ..................... 452/5 |
| 5,120,265 A | | 6/1992 | Ledet et al. |
| 6,139,415 A | * | 10/2000 | Rosow et al. ..................... 452/5 |
| 7,811,157 B1 | * | 10/2010 | Wimberly, Jr. .................... 452/5 |
| 8,616,940 B2 | * | 12/2013 | Vedsted et al. .................... 452/5 |

FOREIGN PATENT DOCUMENTS

| | | |
|---|---|---|
| GB | 2222787 A | 3/1990 |
| WO | WO03/051537 A1 | 6/2003 |

OTHER PUBLICATIONS

International Search Report for PCT/DK2012/000037, mailed Jun. 8, 2012, 2 pages.

* cited by examiner

*Primary Examiner* — Richard Price, Jr.
(74) *Attorney, Agent, or Firm* — William J. Sapone; Ware Fressola; Maguire & Barber LLP

(57) ABSTRACT

A shrimp peeling machine (1) is provided with a closed chain (3) consisting of a number of joints (14,15), which contain cylindrical rollers (4, 5, 6). The cylindrical rollers' longitudinal axis is displaced 90 degrees in relation to the shrimp peeling process direction (13). The rollers can be turned by activation of toothed wheel (7), the chain operated by at least one toothed wheel (12), which is connected to a motor device (10,11). The rollers' mutual placement can be adjusted using position regulation guys (17). It is hereby achieved that the shrimp peeling machine, contrary to the hitherto known technique, can be mounted and function in shrimp trawlers. With the invention, in a continuous process, shrimp can be landed in a shrimp trawler and be boiled, peeled and packaged on the vessel and thus be ready for sale to the consumers, as soon as the trawler reaches harbour.

9 Claims, 5 Drawing Sheets

SHRIMP PEELING MACHINE AND METHOD AND APPLICATION

CROSS REFERENCE TO RELATED APPLICATIONS

This application is a National Stage of PCT International Application no. PCT/DK2012/00037, filed Apr. 11, 2012, claiming priority in Danish Patent Application no. PA 2011 00324, filed 27 Apr. 2011, the contents of which are hereby incorporated by reference.

TECHNICAL FIELD

The invention relates to a shrimp peeling machine for operation in stationary land based production facilities and in maritime production facilities including in fishing boats such as shrimp trawlers where the shrimp peeling occurs in a shrimp peeling process direction, where the shrimp peeling machine is provided with a closed chain consisting of a number of joints, which contains cylindrical rollers, where the longitudinal axis of the cylindrical rollers is displaced 90 degrees in relation to the shrimp peeling process direction and where the rollers can be turned by activation of toothed wheel and where the chain is operated by at least one toothed wheel, which is connected to a motor unit, where the cylindrical rollers have a metallic or a polymeric surface.

Also, the invention relates to a method for utilization of shrimp peeling machine.

Furthermore, the invention relates to application of shrimp peeling machine.

BACKGROUND

From U.S. Pat. No. 5,120,265(A), a method and a shrimp peeling machine are known where skewed parallel rollers are used for peeling or shelling boiled shrimp.

The skewed rollers are characterized in that their longitudinal direction runs in the same direction as the shrimp peeling process direction.

It has been found, however, that there are some drawbacks of this known technique, including that the efficiency of the shrimp peeling machine from U.S. Pat. No. 5,120,265 to an extensive degree is dependent on the angle, by which the parallel rollers are skewed.

This drawback, among others, results in that it has not been possible to use the known technique in shrimp trawlers since the trawlers' movement in the open sea will inevitably change the angle in relation to a horizontal level by which the parallel rollers are skewed.

The hitherto known technique has therefore in practice only functioned satisfyingly on land based production facilities.

It is obviously a drawback since the shrimps therefore must be frozen on the trawlers and then thawed when they must subsequently be peeled on the land-based shrimp peeling facilities.

The peeled shrimps can subsequently be refreezed for sale to the consumers.

The finished product has therefore gone through two freezing processes before it can be sold to the consumers.

The quality of the finished peeled shrimps is therefore lower than if the shrimps could be finish processed including being peeled directly after they were landed on the shrimp trawlers.

Concurrently, the whole manufacturing process is allocated to two places namely partly on the fishing boats and partly on the land based shrimp peeling production facilities, which is not optimum.

From U.S. Pat. No. 2,832,092, there is known a shrimp peeling machine where the shrimp peeling occurs in a shrimp peeling process direction. The shrimp peeling machine includes an endless conveyor belt, which includes an endless chain with a number of joints, which contain cylindrical rollers.

The longitudinal axis of the cylindrical rollers is displaced 90 degrees in relation to the shrimp peeling process direction and the rollers are turned by activation of a toothed wheel. The endless conveyor belt is operated by two larger driving toothed wheels, since the conveyor belt's rotation is started by mesh between the toothed wheel on the shaft for the rollers and the larger driving toothed wheels, whereby the rollers are rotated in tracks, which run along the sides of the endless conveyor belt. The rollers include rollers with a polymeric surface and rollers from metal, where the rollers with the polymeric surface have a larger diameter than the rollers from metal. Shrimps are added to the endless conveyor belt in the top via a conveyance belt, the shrimps are shelled, by friction between the activated rollers and the released shells, and are collected under the chain.

It has been found, however, that the technique described in U.S. Pat. No. 2,832,092(A) does not function in a sufficiently efficient manner, including that it is not possible to adjust the mutual position between the rollers, which is used for shelling the shrimps.

SUMMARY OF THE INVENTION

It is therefore an object of the invention to improve the known technique including a shrimp peeling machine, a method and an application.

The object of the invention is achieved by a shrimp peeling machine characterized in that the chain is provided with friction bearings, which forms a seat for rollers, and which is affected by position regulation guys.

In this way it becomes possible to fine adjust the mutual position between the rollers, which shell the shrimps, whereby it becomes possible to make the shrimp peeling efficient, and to shell or peel shrimps without them passing angle sensitive skewed rollers, and the shrimp peeling machine can therefore be applied in shrimp trawlers whereby the shrimps can be peeled immediately after catch whereby a freezing process can be avoided.

Hereby, the quality of the finished product is increased.

Further appropriate embodiments for the shrimp peeling machine are described further below.

As mentioned, the invention also relates to a method for utilisation of the shrimp peeling machine according to the invention.

This method is characterized in that the chain is operated in a rotation direction, which is indicated with the arrow, where shrimp, which are to be peeled, are added to the chain, the chain is operated in a rotational direction, which is indicated with the arrow, where shrimp, which are to be peeled, are added to the chain in the top at the inlet to the horizontal inlet, the shrimps are subsequently shelled by friction through contact to the rollers, which are operated by activation of the rack, the released shrimp shell parts are collected below the chain, and the shelled shrimps can be collected at the end of the chain by the horizontal outlet where the shrimp peeling process is optimised by speed adjustment of the toothed wheel, which operates the chain and by speed adjustment of the rack, which operates the cylindrical rollers. In the top at the inlet to the horizontal inlet, the shrimps are subsequently shelled by friction through contact to the rollers, which are operated by activation of the rack, the released shrimp shell parts are collected below the chain, and the shelled shrimps can be collected at the end of the chain by the horizontal outlet where the shrimp peeling process is optimised by speed adjustment of the toothed wheel, which operates the chain and by speed adjustment of the rack which operates the cylindrical rollers.

It hereby becomes possible to use shrimp peeling machine in a maritime boat such as in shrimp trawlers.

As mentioned, the invention also relates to application of shrimp peeling machine for mounting and operation in maritime boats such as shrimp trawlers.

BRIEF DESCRIPTION OF THE DRAWINGS

The invention will now be explained more fully with reference to the drawings, in which.

DETAILED DESCRIPTION OF THE INVENTION

Figure 1:
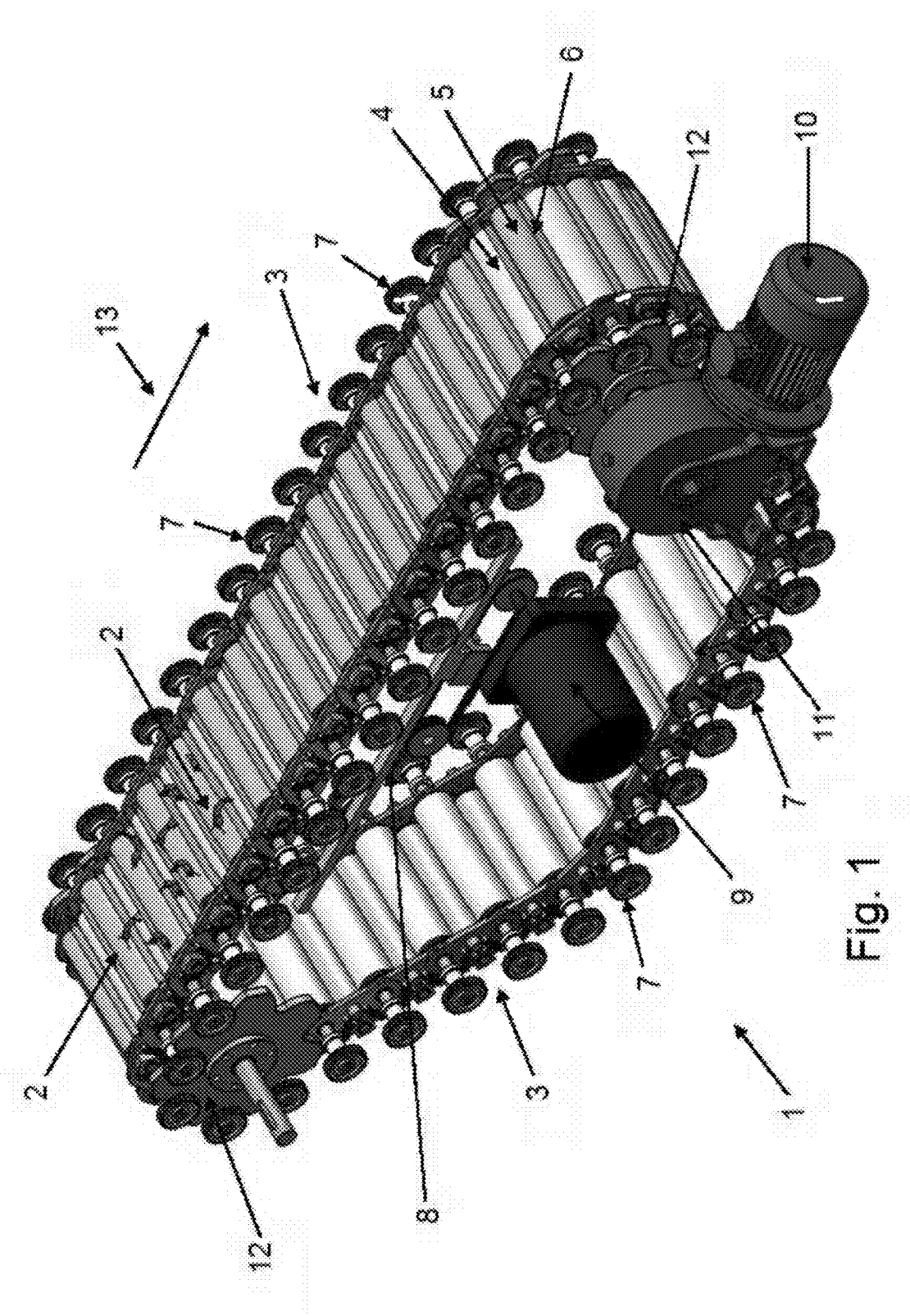
FIG. 1 shows a section of a preferred embodiment of a shrimp peeling machine according to the invention.

In FIG. 1 is shown a section of a shrimp peeling machine 1 where shrimp 2, which are to be peeled, are added to a closed chain 3 at the chain's 3 horizontal inlet in relation to a shrimp peeling process direction 13.

The shrimp peeling machine 1 is provided with a closed chain 3 consisting of a number of joints 14,15, which contain cylindrical rollers 4, 5, 6, where the cylindrical rollers' 4, 5, 6 longitudinal axis is displaced 90 degrees in relation to the shrimp peeling process direction 13 and where the rollers 4, 5, 6 can be turned by activation of toothed wheel 7 and where the chain 3 is operated by at least one toothed wheel 12, which is connected to a motor unit 10, 11.

The cylindrical rollers 4, 5, 6 have a metallic or a polymeric surface.

In a preferred embodiment, the cylindrical rollers 4, 5, 6 have at least two different diameters.

It is also a characteristic of the shrimp peeling machine 1 that toothed wheel 7, which operates the cylindrical rollers 4, 5, 6 is mounted on an axle 16, which is placed in continuation of a cylindrical roller's 4, 5, 6 axis of rotation.

Moreover, it is a characteristic of the shrimp peeling machine 1 that the axle 16, which forms seat for toothed wheel 7 is used for connection with toothed wheel 12, which operates the chain 3.

The toothed wheels 7 are activated by at least one rack 8, which is operated by an activator 9 such as a servomotor.

Figure 2:
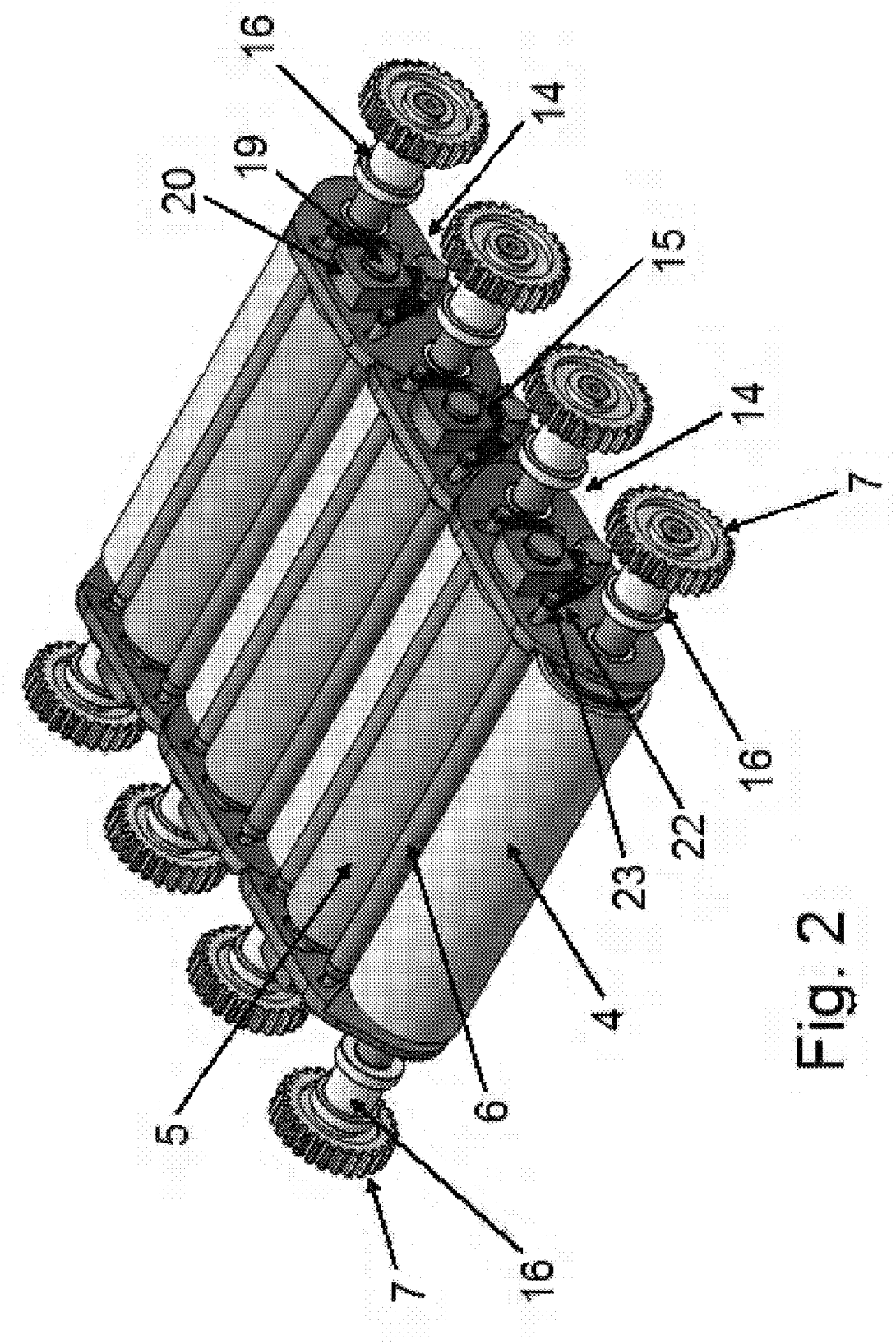
FIG. 2 shows a section of the chain, which is used for shelling or peeling shrimp.

FIG. 2 shows a section of a preferred embodiment of a chain 3 where the chain is composed of joints 14, 15, which each contains rollers 4, 5, 6 where two of the rollers 4, 5 have the same diameter and are provided with a polymeric surface and where the third roller 6 has a, in relation to the additional rollers, smaller diameter and where this roller 6 has a metallic surface.

The shelling of the shrimps occurs by moving the shrimp between the rotating rollers 4, 5, 6.

The described combination of alternating diameters and surfaces of the seat joints 14, 15 containing rollers 4, 5, 6 has shown to be optimum with regard to shelling or peeling shrimps efficiently.

A shrimp peeling process occurs by the chain 8 being operated in a direction of rotation, as stated with the arrow 13, where shrimps 2, which are to be peeled, are added to the chain 8 in the top at the inlet to the horizontal inlet.

The shrimps 2 are subsequently shelled by friction through contact to the rollers 4, 5, 6, which are operated by activation of the rack 8.

The released shrimp shell parts are collected below the chain 8 and the shelled shrimp 2 can be collected at the end of the chain 8 at the horizontal outlet.

In practice, including at installation of the shrimp peeling machine in shrimp trawlers, the shrimp peeling process can be optimised by adjusting the speed of toothed wheel 12, which operates the chain 8 and by speed adjustment of rack 8, which operates the cylindrical rollers 4, 5, 6.

It is a part of the invention that the shrimp peeling machine 1 is mounted and is operated in maritime boats such as shrimp trawlers.

With the invention, it is achieved that shrimps 2 in a continuous process can be landed in a shrimp trawler and subsequently be boiled, peeled and packaged on the vessel and thus be ready for sale to the consumers as soon as the trawler reaches the harbour.

The quality of the ready to be sold and peeled shrimps will thereby be significantly higher than it has hitherto been possible and the production process is optimised and thereby cheaper, among other since the whole shrimp manufacturing process is on the fishing vessel, which lands the shrimp.

Figure 3:
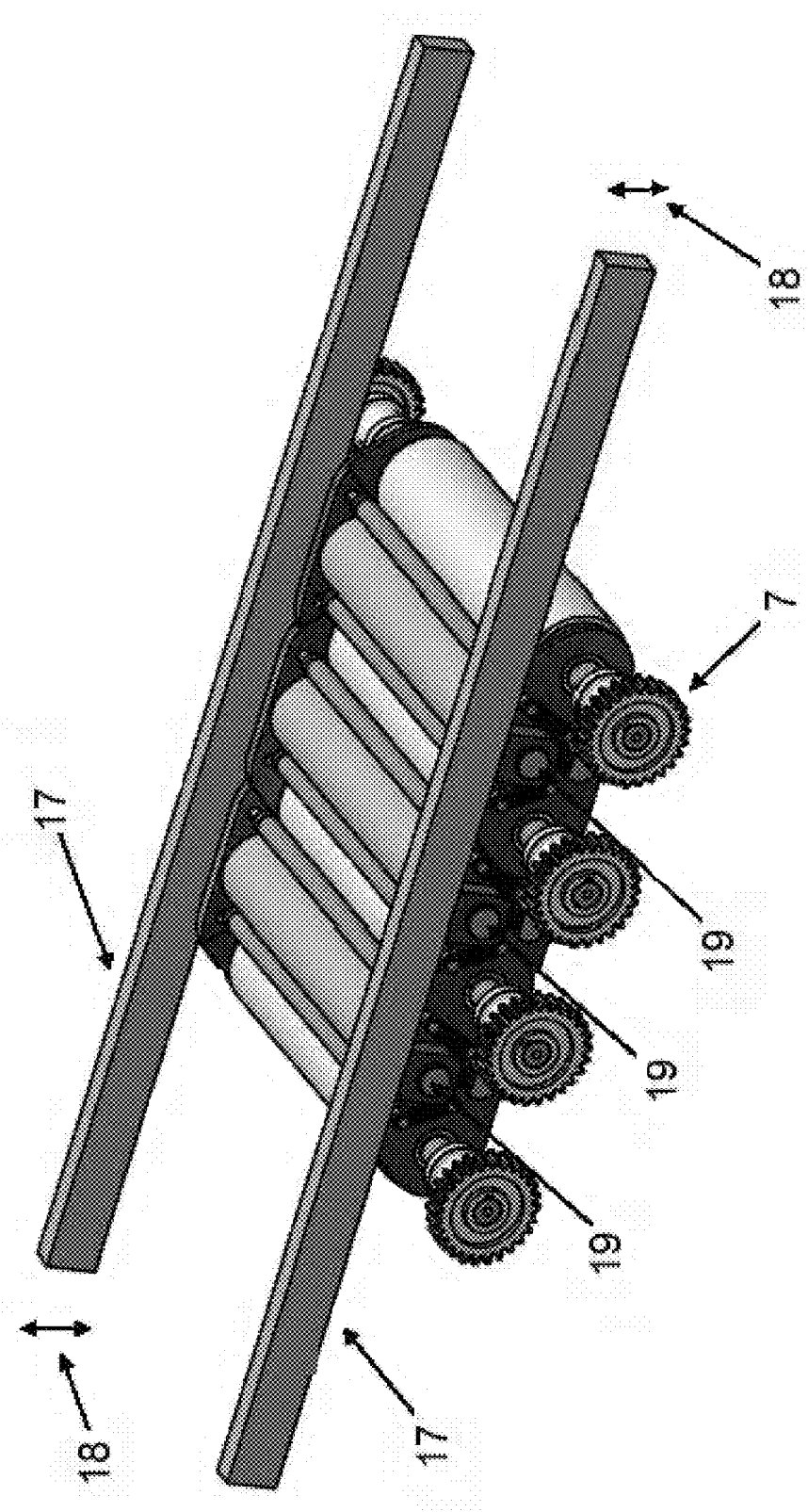
FIG. 3 shows a section of the chain with position regulation guys.

FIG. 3 shows a chain part, which is affected by a position regulation guy 17, which can be adjusted in a dimension, as stated by arrows 18.

Figure 4:
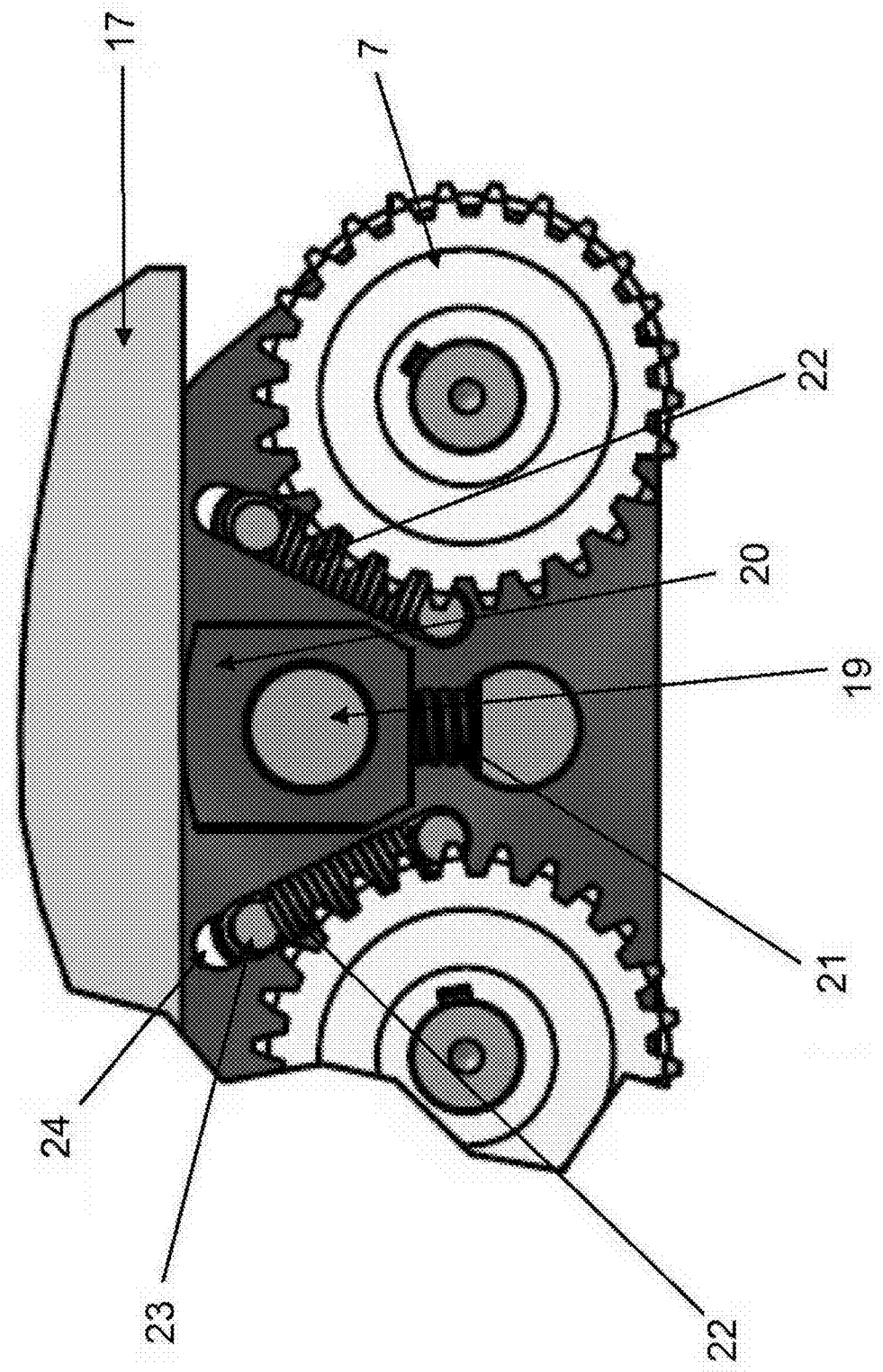
FIG. 4 shows a section of a chain part with position regulation guys.

As shown in FIG. 4, which depicts a section of a chain, which is positioned by the position regulation guys 17, these have connection against the chain at the friction bearing 20, which is pressed against the position regulation guys by effect of a spring 21.

The friction bearing 20 forms a seat for the ends 19 of the rollers 5.

From FIG. 4 is likewise seen that the end 23 of the rollers 6 can glide in a track 24, where the rollers 6 are pressed against the rollers 4 and 5 by force from a spring 22.

Figure 5:
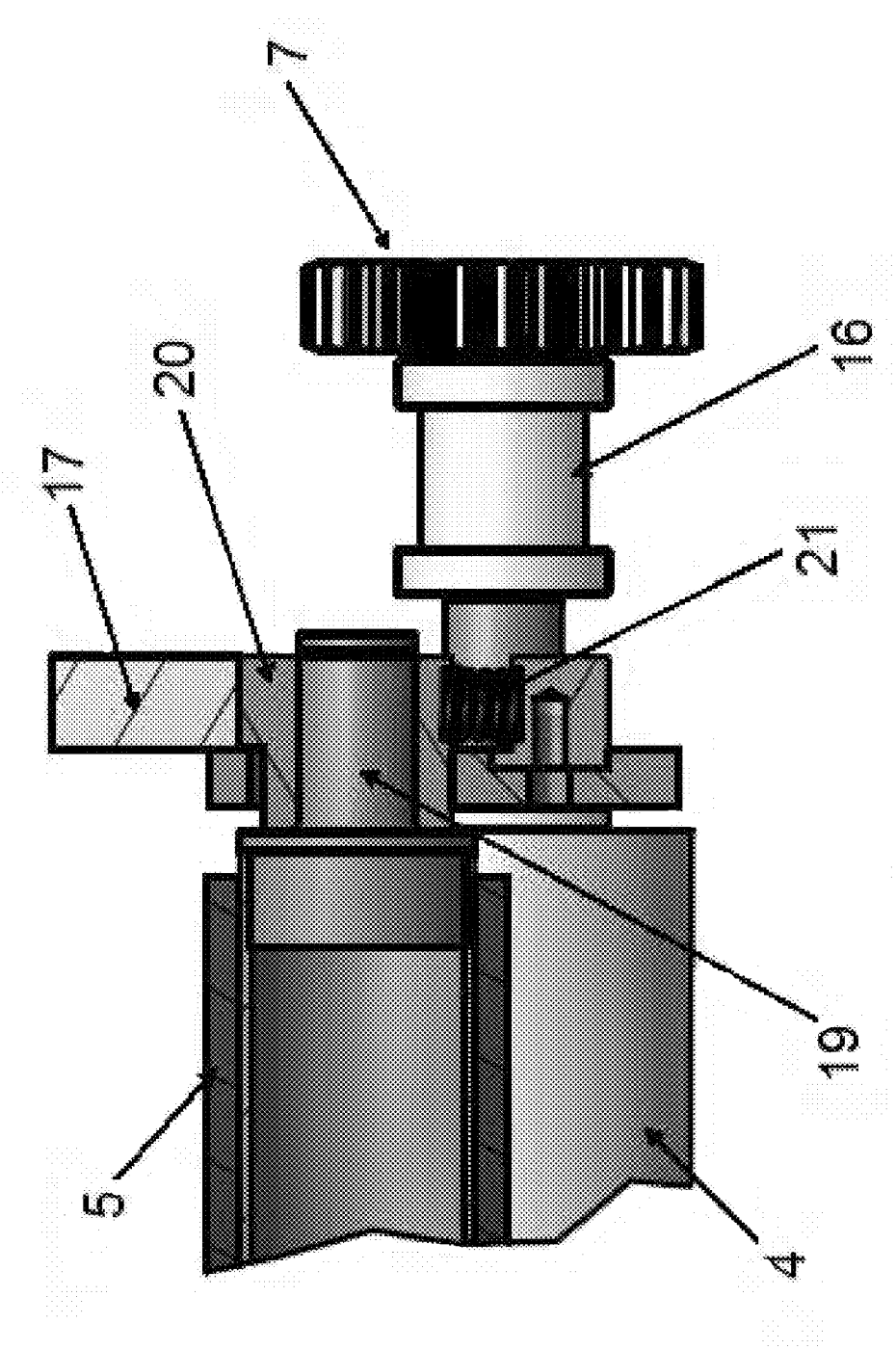
FIG. 5 shows a cross section of a chain part with position regulation guys.

In FIG. 5 is shown a cross section of a chain part, which is positioned by a position regulation guy 17.

When the position regulation guys 17 are position adjusted, the mutual position between the rollers 4, 5 and 6 will thus be changed.

This is applied to control the shrimp peeling since the mutual position between the rollers 4, 5 and 6 is decisive for the shrimp peeling efficiency, which again is a function of the type of shrimp, size and boiling.

What is claimed is:

1. A shrimp peeling machine operable in stationary land based production facilities and in mobile maritime production facilities including fishing boats such as shrimp trawlers comprises:

a closed chain having a number of joints which contain a plurality of cylindrical rollers, a longitudinal axis of each cylindrical roller being displaced 90 degrees in relation to a shrimp peeling process direction, at least one cylindrical roller being turned by activation of a toothed wheel engaged therewith, the closed chain being operated by at least one toothed wheel engaged therewith, which is driven by a motor unit, at least one roller having a metallic surface and at least one other roller having a polymeric surface, wherein the chain joints contain friction bearings forming seats which receive ends of at least one cylindrical roller, position regulation guides engaged with the friction bearings for adjusting a position of the at least one cylindrical roller.

2. The shrimp peeling machine according to claim 1 further comprising springs for biasing the friction bearings relative to the position regulation guys.

3. The shrimp peeling machine according to claim 1 wherein at least one cylindrical roller has ends embedded in tracks for movement therein, the ends being biased by springs for pressing the roller against another cylindrical roller.

4. The shrimp peeling machine according to claim 1 wherein the toothed wheels which operates the at least one cylindrical roller engaged therewith are mounted on an axle which is a continuation of the at least one cylindrical roller's axis of rotation.

5. The shrimp peeling machine according to claim 4 wherein the axle has a seat for meshing with the chain engaged toothed wheel which drives the closed chain.

6. The shrimp peeling machine according to claim 1 wherein cylindrical roller toothed wheels are activated by at least one rack, which is operated by an activator.

7. The shrimp peeling machine according to claim 6 wherein the activator is a servomotor.

8. A method of peeling shrimp comprising:
providing the shrimp peeling machine of claim 1;
moving the closed chain in a shrimp peeling direction;
adding shrimp to be peeled to the chain at a horizontal inlet thereof,
peeling the shrimp as the shrimp move in the shrimp peeling direction using friction applied to shells of the shrimp through contact with the cylindrical rollers, which are operated by activation of the rack;
collecting released shrimp shell parts below the chain;
collecting peeled shrimp at a horizontal outlet of the chain; and,
optimizing the shrimp peeling process by adjusting a speed of the chain engaged toothed wheel which drives the chain, and by adjusting a speed of the rack which drives the cylindrical rollers.

9. The method of claim 8 further comprising mounting the shrimp peeling machine in a maritime vessel such as a shrimp trawler, and, operating the shrimp peeling machine on freshly caught shrimp.

* * * * *